United States Patent
Ishida et al.

(10) Patent No.: US 10,259,148 B2
(45) Date of Patent: Apr. 16, 2019

(54) APPARATUS AND METHOD FOR MANUFACTURING RUBBER SHEET

(71) Applicant: TOYO TIRE & RUBBER CO., LTD., Osaka-shi, Osaka (JP)

(72) Inventors: Takuya Ishida, Osaka (JP); Junji Itakura, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 257 days.

(21) Appl. No.: 15/176,491

(22) Filed: Jun. 8, 2016

(65) Prior Publication Data

US 2016/0361847 A1    Dec. 15, 2016

(30) Foreign Application Priority Data

Jun. 11, 2015    (JP) ................... 2015-118621

(51) Int. Cl.
*A23G 1/02* (2006.01)
*A23G 1/20* (2006.01)
(Continued)

(52) U.S. Cl.
CPC ............ *B29C 43/245* (2013.01); *B29C 43/34* (2013.01); *B29B 17/0005* (2013.01);
(Continued)

(58) Field of Classification Search
CPC ..... B29K 2021/00; B29C 43/22; B29C 43/24; B29C 43/245; B29C 47/0021;
(Continued)

(56) References Cited

U.S. PATENT DOCUMENTS 3,809,907 A * 5/1974 Schuller ............... B29C 43/245
250/548
3,898,024 A * 8/1975 Wockener ............... B01J 19/10
425/145
(Continued)

FOREIGN PATENT DOCUMENTS

EP    0061385 A1 * 9/1982 ........... B29C 43/245
JP    52132072 U * 10/1977
(Continued)

OTHER PUBLICATIONS

Office Action dated Sep. 11, 2018, issued in counterpart Chinese application No. 201610365766.9, with abridged English translation. (17 pages).

(Continued)

*Primary Examiner* — Philip C Tucker
*Assistant Examiner* — Brian R Slawski
(74) *Attorney, Agent, or Firm* — Westerman, Hattori, Daniels & Adrian, LLP

(57) ABSTRACT

In one embodiment of an apparatus for manufacturing a rubber sheet, a continuous rubber material is supplied onto a supply conveyor in a meandering state by supplying the continuous rubber material onto the supply conveyor while moving rubber supply device in a reciprocating manner in a roll axial direction. The rubber supply device has a full width moving mode in which the rubber supply device moves in the roll axial direction such that the continuous rubber material has a meandering shape of a width corresponding to a width of a rubber sheet, and a partial width moving mode in which the rubber supply device moves in the roll axial direction such that the continuous rubber material has a meandering shape of a width obtained by excluding widths of both edge portions of the rubber sheet from the width of the rubber sheet.

4 Claims, 4 Drawing Sheets

(51) Int. Cl.

| | | |
|---|---|---|
| A23G 1/22 | (2006.01) |
| A21C 11/00 | (2006.01) |
| A21C 11/12 | (2006.01) |
| B28B 11/14 | (2006.01) |
| B28B 11/16 | (2006.01) |
| B29B 13/00 | (2006.01) |
| B29B 15/00 | (2006.01) |
| B29B 17/00 | (2006.01) |
| B29B 17/02 | (2006.01) |
| B29B 17/04 | (2006.01) |
| A01J 21/00 | (2006.01) |
| A01J 21/02 | (2006.01) |
| A01J 25/12 | (2006.01) |
| A01J 25/15 | (2006.01) |
| A21C 3/00 | (2006.01) |
| A23G 3/00 | (2006.01) |
| A21C 3/02 | (2006.01) |
| B29C 35/08 | (2006.01) |
| B29C 35/12 | (2006.01) |
| B29C 37/02 | (2006.01) |
| B29C 47/00 | (2006.01) |
| B29C 47/92 | (2006.01) |
| B29C 47/96 | (2006.01) |
| B28B 5/00 | (2006.01) |
| B29C 55/00 | (2006.01) |
| B29C 59/00 | (2006.01) |
| B29C 67/02 | (2017.01) |
| B29C 67/20 | (2006.01) |
| B29D 7/00 | (2006.01) |
| B28B 7/14 | (2006.01) |
| B29B 7/66 | (2006.01) |
| B29C 43/24 | (2006.01) |
| B29C 43/34 | (2006.01) |
| B29C 69/00 | (2006.01) |
| B29K 21/00 | (2006.01) |
| B29K 105/00 | (2006.01) |
| B29L 7/00 | (2006.01) |

(52) U.S. Cl.
CPC .... *B29C 69/001* (2013.01); *B29C 2043/3416* (2013.01); *B29C 2043/3438* (2013.01); *B29K 2021/00* (2013.01); *B29K 2105/0058* (2013.01); *B29L 2007/002* (2013.01)

(58) Field of Classification Search
CPC .... B29C 2043/3416; B29C 2043/3438; B29C 69/001; B29L 2007/002; B29B 17/0005
USPC ........ 264/37.1, 37.3, 37.32, 40.1, 40.7, 138, 264/145, 146, 161, 165, 175, 212, 216; 425/135, 140, 142, 145, 147, 215, 217, 425/223, 224, 289, 306, 307, 308, 447
See application file for complete search history.

(56) References Cited

U.S. PATENT DOCUMENTS

| | | | | |
|---|---|---|---|---|
| 4,642,686 | A | * | 2/1987 | Nagano ................. B29C 43/245 264/40.1 |
| 6,330,024 | B1 | * | 12/2001 | Vargo ................... B29C 43/245 348/135 |

FOREIGN PATENT DOCUMENTS

| | | | | | |
|---|---|---|---|---|---|
| JP | 59020626 | A | * | 2/1984 | ..... B29C 2043/3494 |
| JP | 62056110 | A | * | 3/1987 | |
| JP | 62-184819 | A | | 8/1987 | |
| JP | 03043217 | A | * | 2/1991 | |
| JP | 03049912 | A | * | 3/1991 | ........... B29C 31/044 |
| JP | 06039864 | A | * | 2/1994 | ........... B29C 43/245 |
| JP | 6-126765 | A | | 5/1994 | |

OTHER PUBLICATIONS

"Use and Maintenance Manual for Plastic Rolling Production Line", Edited by Liu Meng Hua et al., China Machine Press, Feb. 2007 1st edition, pp. 85-87; cited in Chinese Office Action dated Mar. 12, 2018.

Office Action dated Mar. 12, 2018, issued in counterpart Chinese Application No. 201610365766.9, with partial English translation. (14 pages).

* cited by examiner

APPARATUS AND METHOD FOR MANUFACTURING RUBBER SHEET

CROSS-REFERENCE TO RELATED APPLICATIONS

This application is based upon and claims the benefit of priority from the prior Japanese Patent Application No. 2015-118621, filed on Jun. 11, 2015; the entire contents of which are incorporated herein by reference.

BACKGROUND

1. Field of the Invention

This embodiment relates to an apparatus and a method for manufacturing a rubber sheet.

2. Related Art

As a method of manufacturing a rubber sheet, there has been known calendering where a strip-shaped or rope-shaped continuous rubber material is supplied between a pair of calender rolls, a hank which is a rubber pool is formed between the calender rolls, and the rubber material in the bank is formed into a sheet shape by rolling thus forming a rubber sheet having a predetermined thickness. In such calendering, to form a rubber sheet having a predetermined thickness in a width direction, it is necessary to set an amount of bank uniform in an axial direction of rolls.

As calendering, there has been known a technique where a continuous rubber material is supplied from a direction perpendicular to an axial direction of calender rolls (see JP-A-06-126765, for example). In forming a rubber sheet having a large width using this technique, a method is adopted where, at the time of supplying a continuous rubber material to calender rolls by way of a guide member, the guide member is moved in a reciprocating manner in the axial direction of calender rolls so that the rubber material is supplied to the calender rolls over the whole length of the calender rolls in the axial direction. However, in the method of supplying a continuous rubber material from a direction perpendicular to the axial direction of calender rolls, even when the continuous rubber material is supplied while moving the guide member in a reciprocating manner, it is difficult to make an amount of bank uniform in the axial direction of the calender rolls. This is because once a continuous rubber material is supplied in a non-uniform manner in an axial direction of rolls, a large rubber pool is generated at one end portion of the calender rolls and, then, the continuous rubber material supplied, by the guide member is pulled toward the large rubber pool so that the continuous rubber material cannot be supplied to the other end portion of the calender rolls.

JP-A-62-184819 discloses that in supplying a continuous rubber material to calender rolls from a supply conveyor, the continuous rubber material placed on the supply conveyor is swung with respect to the supply conveyor in a direction perpendicular to a conveying direction of the conveyor with a width corresponding to a width of the calender rolls so that the continuous rubber material meanders on the supply conveyor, and the continuous rubber material is supplied to the calender rolls in such a state. In this literature, there is a description that the continuous rubber material can be uniformly supplied over the whole width of the calender rolls.

SUMMARY

Both edge portions of the rubber sheet which is rolled by the calender rolls are cut away so that a rubber sheet having a predetermined width is formed. It is desirable that ear portion rubbers which are cut away from both edge portions be returned to a bank and are used for rolling of the rubber sheet from a viewpoint of productivity. Accordingly, a configuration may be considered where ear portion rubbers which are cut away from both end portions are returned to banks at both axial end portions of calender rolls. With such a configuration, however, an amount of bank at both end portions in the axial direction of the calender rolls becomes larger than an amount of bank at a center portion of the calender rolls. Accordingly, with the mere formation of a continuous rubber material having a meandering shape over the whole roll axial direction on the supply conveyor, an amount of bank at the center portion of the calender rolls in the roll axial direction becomes small so that it is difficult to make an amount of bank uniform over the whole length in the whole roll axial direction.

This embodiment has been made in view of the above, and it is an object of this embodiment to provide an apparatus and a method of manufacturing, a rubber sheet which can make an amount of bank in an axial direction of calender rolls uniform thus enhancing a quality of a rubber sheet.

An apparatus for manufacturing a rubber sheet according to this embodiment includes: a pair of calender rolls which forms a bank as a rubber pool; a supply conveyor which supplies a continuous rubber material to the calender rolls for forming the bank; and a rubber supply device which supplies the continuous rubber material onto the supply conveyor in a meandering state by supplying the continuous rubber material onto the supply conveyor while moving in a reciprocating manner in an axial direction, of the calender rolls. The rubber supply device has a full width moving mode in which the rubber supply device moves in the axial direction of the calender rolls such that the continuous rubber material placed on the supply conveyor has a meandering shape of a width corresponding to a width of a rubber sheet, and a partial width moving mode in which the rubber supply device moves in the axial direction of the calender rolls such that the continuous rubber material placed on the supply conveyor has a meandering shape of a width obtained by excluding widths of both edge portions of the rubber sheet from the width of the rubber sheet (that is, a width obtained by narrowing a width of the rubber sheet from both edges of the rubber sheet).

In a method for manufacturing a rubber sheet according to this embodiment, a bank which constitutes a rubber pool is formed on calender rolls by continuously supplying a rubber material to the calender rolls from a supply conveyor, and the rubber material in the bank is formed into a sheet shape by rolling. The method includes a rubber supply step of supplying a continuous rubber material onto the supply conveyor in a meandering state by feeding the continuous rubber material to the supply conveyer from a rubber supply device while moving the rubber supply device in a reciprocating manner in an axial direction of the calender rolls. The rubber supply step includes: a full width moving step of moving the rubber supply device in the axial direction of the calender rolls such that the continuous rubber material placed on the supply conveyor has a meandering shape of a width corresponding to a width of a rubber sheet; and a partial width moving step of moving the rubber supply device in the axial direction of the calender rolls such that the continuous rubber material placed on the supply conveyor has a meandering shape of a width obtained by excluding widths of both edge portions of the rubber sheet from the width of the rubber sheet (that is, a width obtained by narrowing a width of the rubber sheet from both edges of the rubber sheet).

According to this embodiment, an amount of bank in an axial direction of calender rolls is made uniform thus enhancing a quality of a rubber sheet.

DESCRIPTION OF THE PREFERRED EMBODIMENTS

Hereinafter, an embodiment is described with reference to drawings.

Figure 1:
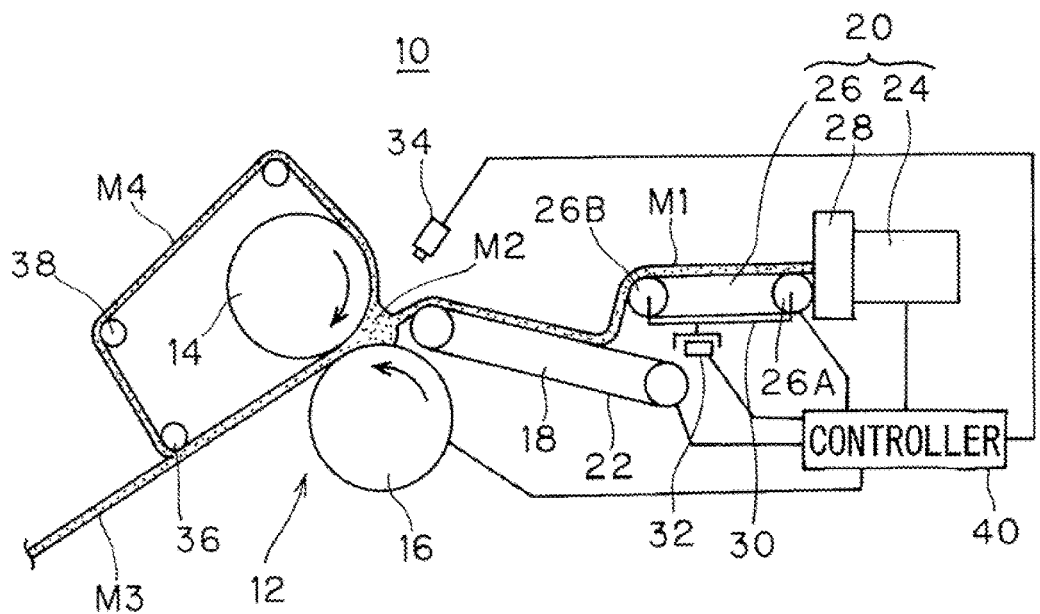
FIG. 1 is a side view schematically showing an apparatus for manufacturing a rubber sheet according to one embodiment.
Figure 2:
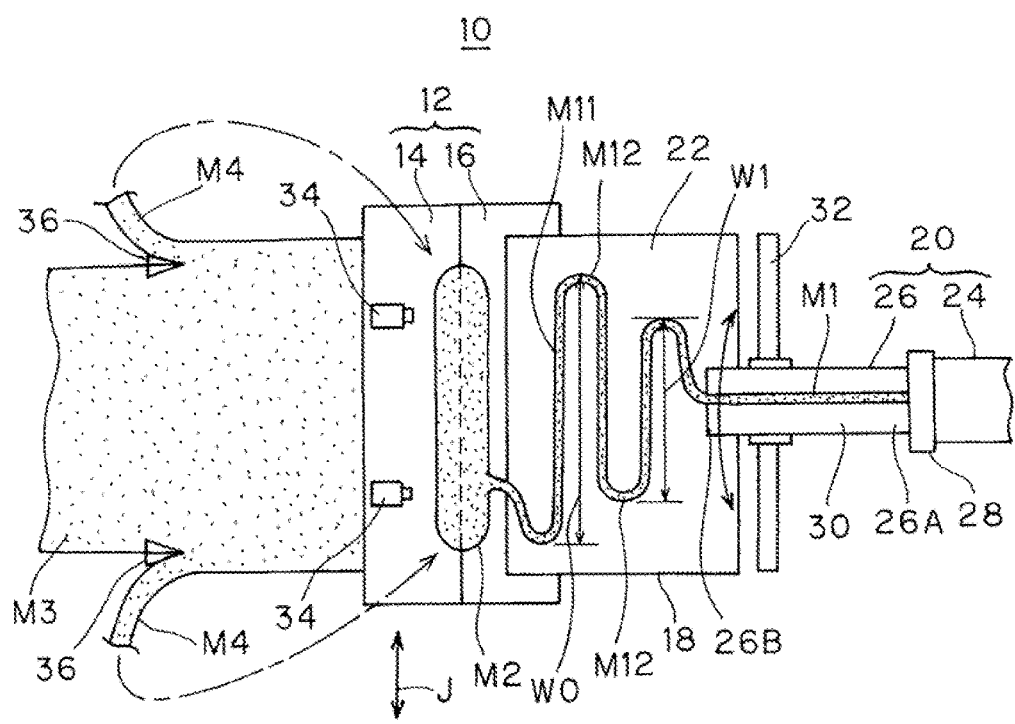
FIG. 2 is a plan view schematically showing the apparatus for manufacturing a rubber sheet.

As shown in FIG. 1 and FIG. 2, an apparatus 10 for manufacturing a rubber sheet. (hereinafter referred to as manufacturing apparatus 10) according to one embodiment includes: a calender 12 formed of a pair of calender rolls 14, 16; a supply conveyor 18 for supplying a continuous rubber material M1 to the calender rolls 14, 16; and a rubber supply device 20 for supplying the continuous rubber material M1 onto the supply conveyor 18.

The calender rolls 14, 16 forming a pair are arranged axially parallel to each other with a predetermined distance therebetween, and a bank M2 which is a rubber pool is formed between both rolls 14, 16. Both rolls 14, 16 have the same diameter, and rotate in directions opposite to each other so as to nip a rubber material whereby the rubber material in the bank M2 is formed into a sheet shape by rolling, and a rubber sheet M3 having a predetermined thickness is fed to a side opposite to the bank M2.

The supply conveyor 18 is a belt conveyor where a belt 22 extends between and is wrapped round a pair of rolls. The supply conveyor 18 supplies the continuous rubber material M1 to the calender rolls 14, 16 so as to form the above-mentioned bank M2. Accordingly, the pair of calender rolls 14, 16 is disposed in the vicinity of one end portion of the supply conveyor 18 so as to directly receive the continuous rubber material M1 supplied from the supply conveyor 18. Hereinafter, an end portion of the supply conveyor 18 on a front side in the conveying direction is referred to as "front end portion", and an end portion of the supply conveyor 18 on a side opposite to the front end portion is referred to as "rear end portion" (the same definition being also applied to a oscillating conveyor described later). As shown in FIG. 2, a width of the supply conveyor 18 (to be more specific, a width of a belt 22) is set substantially equal to a width of the calendar rolls 14, 16.

The rubber supply device 20 is configured to supply the continuous rubber material M1 onto the supply conveyor 18 in a meandering state as shown in FIG. 2 by supplying the continuous rubber material M1 onto the supply conveyor 18 while moving (that is, running or operating) in a reciprocating manner in the axial direction J of the calender rolls 14, 16 (hereinafter referred to as "roll axial direction"). As the rubber supply device 20, a rubber supply means which utilizes a pendular motion by using a known pendulum may be used. In this embodiment, however, the rubber supply device 20 is formed of an oscillating conveyor.

To be more specific, in this embodiment, the rubber supply device 20 includes an extruder 24 which continuously extrudes the rubber material M1, and an oscillating conveyor 26 which supplies the extruded continuous rubber material M1 onto the supply conveyor 18.

With respect to a continuous rubber material M1 which is an unvulcanized rubber material extruded from a mouthpiece 28 of the extruder 24, it is sufficient that the continuous rubber material M1 is continuously extruded from the mouthpiece 28 in a elongated shape. A cross-sectional shape of the continuous rubber material M1 is not particularly limited. For example, the continuous rubber material M1 may be a strip-like rubber material having a flat cross-sectional shape. Alternatively, the continuous rubber material M1 may be a rope-shaped rubber material having a rounded cross-sectional shape.

The oscillating conveyor 26 is a belt conveyor where a belt 30 extends between a pair of rolls. A rear end portion 26A of the oscillating conveyor 26 is disposed in the vicinity of the mouthpiece 28 of the extruder 24. The oscillating conveyor 26 receives a continuous rubber material M1 extruded from the mouthpiece 28, and supplies the continuous rubber material M1 to a rear end portion of the supply conveyor 18 from a front end portion 26B thereof.

The oscillating conveyor 26 is configured such that the end portion (front end portion) 26B of the oscillating conveyor 26 on a supply conveyor 18 side is movable in a reciprocating manner in the roll axial direction J using the end portion (rear end portion) 26A of the oscillating conveyor 26 on an extruder 24 side as a pivot. To be more specific, the front end portion 26B of the oscillating conveyor 26 is mounted on a guide rail 32 extending in the roll axial direction J, and moves in a reciprocating manner along the guide rail 32 so that the front end portion 26B performs an oscillating movement in the roll axial direction J (the width direction of the supply conveyor 18) using the rear end portion 26A as a pivot.

With such a configuration, the oscillating conveyor 26 can supply the continuous rubber material M1 onto the belt 22 of the supply conveyor 18 in a meandering state. A meandering shape of the continuous rubber material M1 placed on the supply conveyor 18 is formed of a plurality of width direction portions M11 extending in the width direction of the supply conveyor 18; and turning portions M12 each of which connects end portions of the width direction portions M11 adjacently arranged with each other alternately on left and right sides. The continuous rubber material M1 supplied in the meandering shape in this manner is supplied to the calender rolls 14, 16 as it is. That is, the continuous rubber material M1 is supplied to the calender rolls 14, 16 after the shape of the continuous rubber material M1 is determined on the supply conveyor 18 such that the continuous rubber material M1 takes a posture parallel to the roll axial direction J. Accordingly, it is possible to supply the continuous rubber material M1 to a position in the roll axial direction J to which the supply of the continuous rubber material M1 is desired.

Symbol 34 indicates sensors which detect an amount of bank at both end portions in the axial direction J of the calender rolls 14, 16. The sensors 34 are formed of left and right sensors forming a pair in the axial direction J. The sensors 34 detect amounts of banks which are amounts of rubbers at end portions in the width direction of the bank M2 by detecting a height of the bank M2 formed between the pair of calender rolls 14, 16, for example.

Symbols 36 indicate ear portion rubber cutting devices which cut away both edge portions in the width direction of the rubber sheet M3 rolled by the calender 12 thus forming a rubber sheet having a predetermined width. The ear portion rubber cutting devices 36 are formed of a pair of left and right ear portion rubber cutting devices forming a pair. Ear portion rubbers M4 which are cut away by the ear portion rubber cutting devices 36 are returned to the bank M2 in the calender 12 by way of ear portion rubber returning devices 38. The ear portion rubber returning devices 38 are formed of left and right ear portion rubber returning devices forming a pair corresponding to the ear portion rubbers M4 on both edge portions in the width direction of the rubber sheet M1 As shown in FIG. 2, the ear portion rubber returning devices 38 are configured to return left and right ear portion rubbers M4 cut away from both edge portions in the width direction of the rubber sheet M3 to corresponding end portions of the bank M2 formed between the calender rolls 14, 16 in the axial direction J respectively. In this embodiment, the ear portion rubber returning device 38 is formed of a plurality of rolls. However, for example, the configuration may be adopted where the cut ear portion rubbers M4 are separated from the rubber sheet M3 by making use of a suction device or the like and, thereafter, the cut ear portion rubbers M4 are returned to both end portions of the bank M2.

Symbol 40 indicates a controller of the manufacturing apparatus 10. The controller 10 is connected to the above-mentioned respective constitutional elements such as the calender rolls 14, 16, the supply conveyor 18, the extruder 24, the oscillating conveyor 26 and the sensors 34, and controls operations of these constitutional elements.

In the manufacturing apparatus 10, the rubber supply device 20 (to be more specific, the oscillating conveyor 26) has a full width moving mode in which the rubber supply device 20 moves in the roll axial direction 3 such that a continuous rubber material M1 placed on the supply conveyor 18 has a meandering shape of a width W0 corresponding to a width of a rubber sheet, and a partial width moving mode in which the rubber supply device 20 moves in the roll axial direction 3 such that a continuous rubber material M1 placed on the supply conveyor 18 has a meandering shape of a width W1 obtained by excluding widths of both edge portions of the rubber sheet from a width of the rubber sheet (that is, a width obtained by narrowing a width of the rubber sheet from both edges of the rubber sheet).

Figure 3:
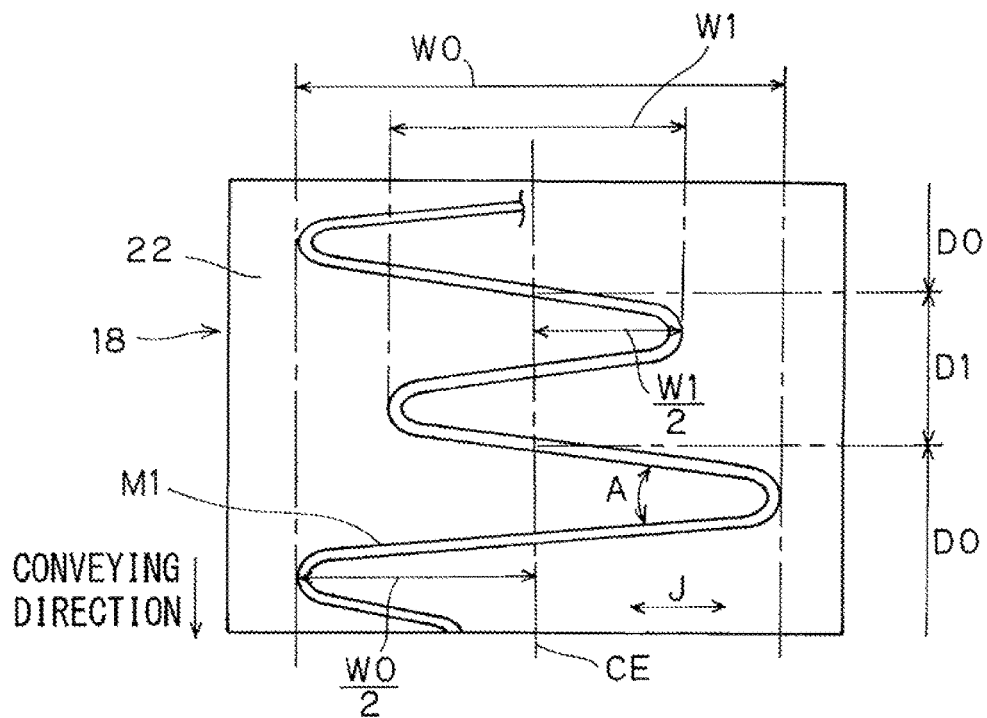
FIG. 3 is a view showing one example of a meandering shape of a continuous rubber material on a supply conveyor.

To be more specific, in a full width moving mode, an amount of oscillation of the oscillating conveyor 26 (a moving amount of the oscillating conveyor 26 in the roll axial direction 3) is set to a width W0 substantially equal to a width of a rubber sheet M3 which is an object to be formed. In FIG. 3, symbol D0 indicates a zone where a continuous rubber material M1 is supplied in a full width moving mode. The continuous rubber material M1 placed on the supply conveyor 18 has a meandering shape of the width W0 which reciprocates in the width direction of the supply conveyor 18, and a swing width of the oscillating conveyor 26 from a center CE of the width of the rubber sheet is set to W0/2 on both left and right sides. Here, it is sufficient that the width (amount of oscillation) W0 of the meandering shape of the continuous rubber material M1 in a full width moving mode corresponds to the width of the rubber sheet to an extent that the rubber sheet M3 can be formed over the whole width thereof. The width W0 may be substantially the same as the width of the rubber sheet.

On the other hand, in a partial width moving mode, an amount of oscillation of the oscillating conveyor 26 is set to a width W1 smaller than a width of the rubber sheet M3 which is an object to be formed. The amount of oscillation W1 in a partial width moving mode has a width obtained by narrowing a width of an amount oscillation W0 in a full width moving mode from both ends of the width. In FIG. 3, symbol D1 indicates a zone where a continuous rubber material M1 is supplied in a partial width moving mode. The continuous rubber material M1 placed on the supply conveyor 18 has a meandering shape which reciprocates in the width direction of the supply conveyor 18 with a width W1. A swing width of the oscillating conveyor 26 from the center CE of the width of the rubber sheet is set uniform on both left and right sides, and is set to W1/2.

Figure 4:
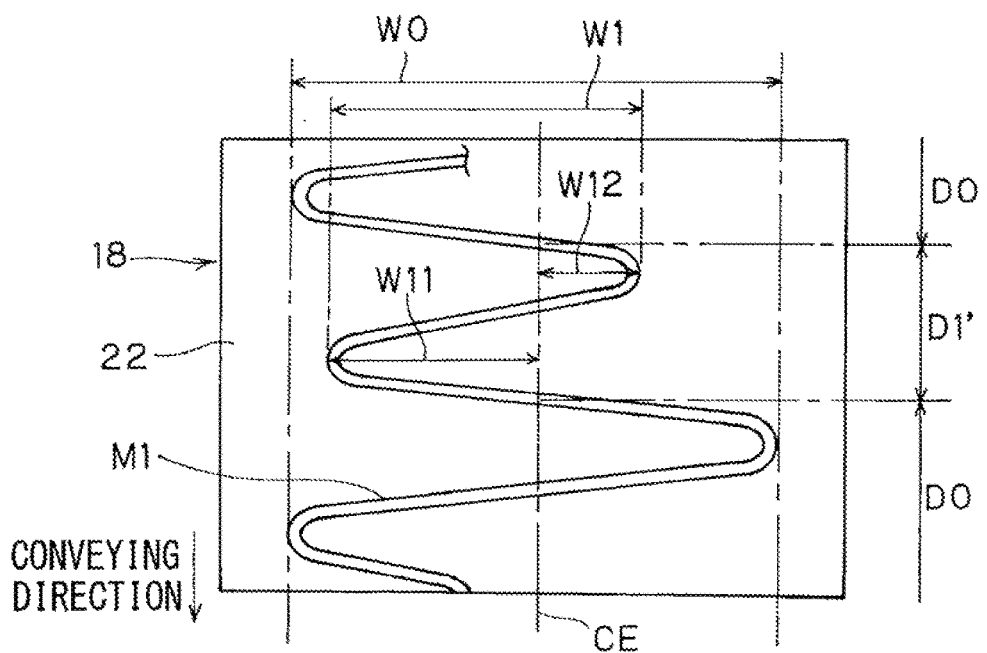
FIG. 4 is a view showing another example of the meandering shape of the continuous rubber material on the supply conveyor.

In the manufacturing apparatus 10, the controller 40 controls a swing width of the rubber supply device 20 in a partial width moving mode from the center CE of a width of the rubber sheet such that a swing width on one end portion side Where an amount of bank is small out of amounts of banks at both end portions detected by the sensors 34 is larger than the swing width on the other end portion side where an amount of bank is large. That is, in a partial width moving mode, when the amounts of banks at both left and right end portions differ from each other, the controller 40 sets swing widths of the oscillating conveyor 26 on left and right sides to values which differ from each other instead of setting the swing widths equal to each other, FIG. 4 shows one example of such a case. For example, in the drawing, assume that an amount of bank on the left end portion is small. In this case, in a zone indicated by symbol D1' where a continuous rubber material M1 is supplied in a partial width moving mode, a swing width W11 of the oscillating conveyor 26 on the left end portion side where an amount of bank is small is set larger than a swing width W12 of the oscillating conveyor 26 on the right end portion side where an amount of bank is large.

Figure 5:
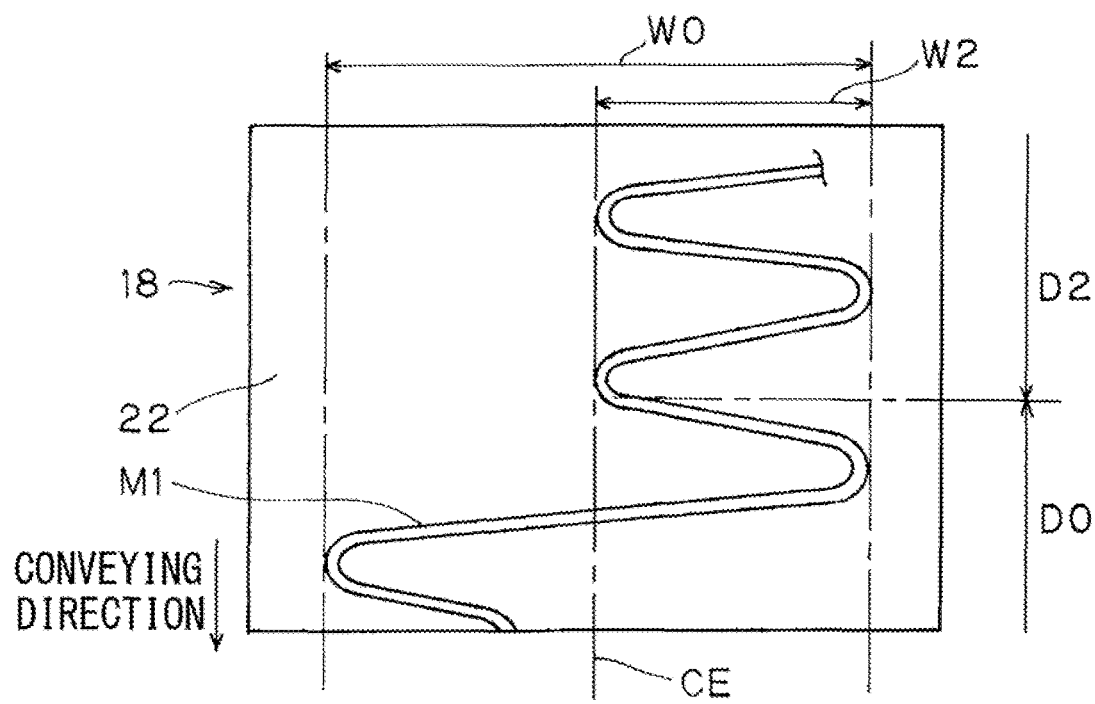
FIG. 5 is a view showing still another example of the meandering shape of the continuous rubber material on the supply conveyor.

In the manufacturing apparatus 10, the rubber supply device 20 may have a one-side moving mode in which the rubber supply device 20 moves in the roll axial direction J such that the continuous rubber material M1 placed on the supply conveyor 18 has a shape which meanders only on one side with respect to the center CE of the width of the rubber sheet (see FIG. 5).

Next, a method of manufacturing a rubber sheet M3 using the manufacturing apparatus 10 is described.

In manufacturing the rubber sheet M3, firstly, a length by which a continuous rubber material M1 flows per one minute is calculated based on a shape of a discharge port of the mouthpiece 28 of the extruder 24 and a discharge capacity of the extruder 24. Then, a speed at which a continuous rubber material M1 flows is calculated, and such a speed is set as a conveying speed CV1 of the oscillating conveyor 26. Next, an amount of oscillation W0 (an amount of oscillation in a full width moving mode) of the oscillating conveyor 26 is set based on a width of the rubber sheet and, at the same time, a turning angle A (20 degrees, for example, see FIG. 3) of a meandering shape of the continuous rubber material M1 formed on the supply conveyor 18 is set. A conveying speed CV2 of the supply conveyor 18 is calculated based on the conveying speed CV1 of the oscillating conveyor 26, an amount of oscillation W0, and the turning angle A.

An amount of oscillation W1 in a partial width moving mode is also set together with an amount of oscillation W0 in a full width moving mode. The amount of oscillation W1 can be set corresponding to amounts of ear portion rubbers M4 returned by way of the ear portion rubber returning device 38. For example, in the case where a width of a rubber sheet (an amount of oscillation W0 over the whole width) is 500 mm, the positions which are narrowed from both left and right edges of the rubber sheet by 100 mm respectively can be set as both ends of the amount of oscillation W1 (that is, W1=300 mm). The amount of oscillation W1 may be set based on a result of a simulation performed before an actual manufacture of a rubber sheet.

In manufacturing a rubber sheet M3, a rubber material M1 is continuously extruded from the extruder 24, and an extruded continuous rubber material M1 is supplied to the supply conveyor 18 by way of the oscillating conveyor 26. The continuous rubber material M1 supplied onto the supply conveyor 18 is supplied to the calender rolls 14, 16 from the supply conveyor 18 so that a bank M2 is formed in the calender rolls 14, 16, and the rubber material in the bank M2 is formed into a sheet shape by the calender rolls 14, 16. In this embodiment, at this stage of operation, both edge portions in the width direction of the rubber sheet M3 rolled by the calender 12 are cut away by the ear portion rubber cutting, devices 36, and the ear portion rubbers M4 cut away from both edge portions are returned to both end portions of the bank M2 of the calender 12 by way of the ear portion rubber returning device 38.

In the rubber supply step of supplying the continuous rubber material M1 onto the supply conveyor 18, the oscillating conveyor 26 supplies a continuous rubber material M1 onto the supply conveyor 18 in a meandering state by making an end portion 26B thereof on a supply conveyor 18 side move in a reciprocating manner in the roll axial direction J using the end portion 26A on an extruder 24 side as a pivot.

The rubber supply step includes a full width moving step where the oscillating conveyor 26 is operated in a hill width moving mode, and a partial width moving step where the oscillating conveyor 26 is operated in a partial width moving mode. In this embodiment, as shown in FIG. 3, the full width moving step (D0) is performed firstly and the partial width moving step (D1) is performed next, and both steps are basically repeated alternately. The number of times of oscillation of the oscillating conveyor 26 in the full width moving step and the number of times of oscillation of the oscillating conveyor 26 in the partial width moving step are not particularly limited. For example, the oscillating conveyor 26 may perform one reciprocating movement or a plurality of reciprocating movements in the roll axial direction J in the full width moving step and in the partial width moving step respectively. Further, the number of times of reciprocating movement may differ from each other between the full width moving step and the partial width moving step. The number of times of oscillation may be set corresponding to amounts of ear portion rubbers M4 returned by way of the ear portion rubber returning devices 38, or may be set based on a result of a simulation performed in advance.

While repeatedly performing the above-mentioned two steps, amounts of banks at both end portions in the axial direction J of the calender rolls 14, 16 are detected by the sensors 34. When the difference between amounts of banks at both end portions is a predetermined first threshold value or more, as shown in FIG. 4, in the partial width moving step (D1'), a swing width from a center CE of the width of the rubber sheet is set such that the swing width on one end portion side where an amount of bank is small is larger than the swing width on the other end portion side where an amount of bank is large (W11>W12).

When the difference between the amounts of banks at both end portions is equal to or more than a second threshold value which is larger than the first threshold value, a one-side moving step is performed. As shown in FIG. 5, to supply a continuous rubber material M1 only to one end portion side where the amount of bank is small, a one-side moving mode is performed where the oscillating conveyor 26 is made to move in the roll axial direction J in a reciprocating manner only on one side with respect to the center CE of the width of the rubber sheet. Accordingly, the continuous rubber material M1 is formed into a shape which meanders only on one side. In FIG. 5, symbol D2 indicates a zone where the continuous rubber material M1 is supplied in a one-side moving mode. In this case, an amount of oscillation W2 can be set to W0/2, for example.

Figure 6:
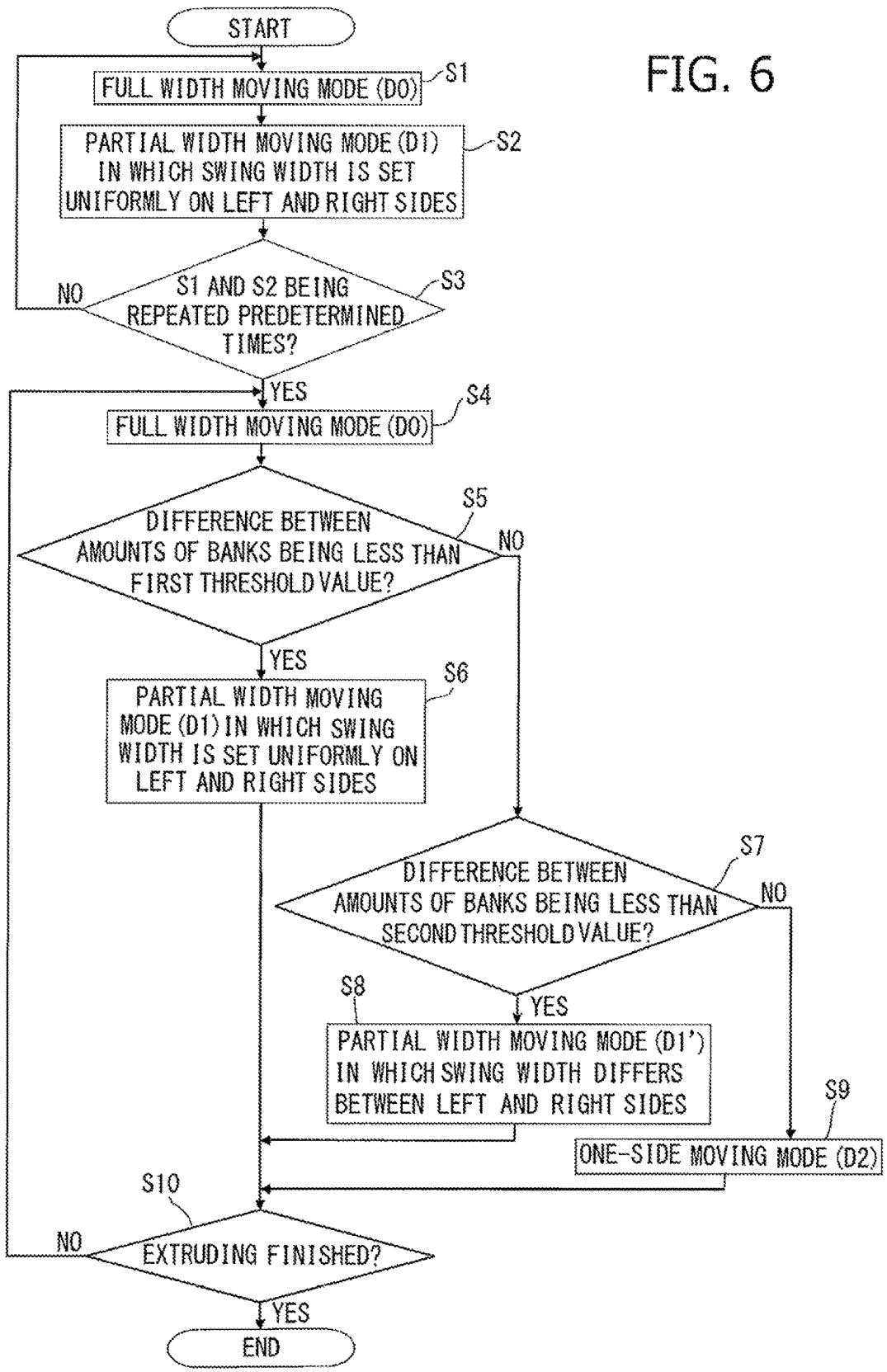
FIG. 6 is a flowchart showing one example of a control of an automatic operation in a rubber supply step.

One example of a control of an automatic operation in the rubber supply step is described with reference to FIG. 6.

When an automatic operation is started, firstly, the oscillating conveyor 26 is operated in a full width moving mode (D0) in step S1. Next, in step S2, the oscillating conveyor 26 is operated in a partial width moving mode (D1) in which a swing width is set uniformly on left and right sides. Then, in step S3, it is determined whether or not steps S1 and S2 are repeated predetermined times, and steps S1 and S2 are repeated until a bank M2 is formed in the calender rolls 14, 16, and rolling of a rubber sheet M3 is started (see FIG. 3).

After steps S1 and S2 are repeated predetermined times, in step S4, a full width moving mode (D0) is performed. Next, in step S5, the difference between amounts of banks at both end portions detected by the sensors 34 is calculated, it is determined whether or not the difference between the amounts of banks is less than a first threshold value. When it is determined that the difference is less than the first threshold value, in step S6, in the same manner as step S2, a partial width moving step is performed where the oscillating conveyor 26 is operated in a partial width moving mode (D1) in which a swing width is set uniformly on left and right sides. Then, the processing advances to step S10.

In step S5, when the difference between the amounts of banks is the first threshold value or more, the processing advances to step S7, and it is determined whether or not the difference between the amounts of banks is less than a second threshold value. When it is determined that the difference between the amounts of banks is less than the second threshold value, in step S8, a partial width moving step is performed where the oscillating conveyor 26 is operated in a partial width moving mode (D1') in which a swing width differs between left and right sides (see FIG. 4). In this case, in determining the degree of difference to be set between the swing widths on left and right sides, the difference between the amounts of banks is divided into a plurality of stages between a first threshold value and a second threshold value, and a swing width W11 on a left side from the center CE of the width of the rubber sheet and a swing width W12 on a right side from the center CE of the width of the rubber sheet are set corresponding to the respective stages. That is, the degree of difference to be set between the swing widths on left and right sides is determined such that the larger the difference between the amounts of banks on left and right sides, the larger the difference between a swing, width W11 on a left side and a swing width W12 on a right side is set. With such setting, the difference between the amounts of banks at both end portions can be reduced at an earlier stage and hence, it is possible to make an amount of bank uniform in the roll axial direction J. Then, the processing advances to step S10.

When the difference between amounts of the banks is the second threshold value or more in step S7, the processing advances to step S9, and one-side moving step is performed where the oscillating conveyor 26 is operated in a one-side moving mode (D2) (see FIG. 5). Thereafter, the processing advances to step S10.

When the extrusion by the extruder 24 is not finished in step S10, the processing returns to step S4, and steps S4 to S9 are repeated until the extrusion is finished.

As described above, a continuous rubber material M1 supplied onto the supply conveyor 18 is subsequently supplied to the calender rolls 14, 16, and is formed into a sheet shape by rolling by the calender rolls 14, 16 and, further, the ear portion rubbers M4 are cut so that a rubber sheet M3 of a predetermined width is manufactured.

According to this embodiment, the rubber supply device 20 which supplies a continuous rubber material M1 onto the supply conveyor 18 has a full width moving mode in which the rubber supply device 20 oscillates so as to have a meandering shape of a width W0 which corresponds to a width of a rubber sheet, and a partial width moving mode in which the rubber supply device 20 oscillates so as to have a meandering shape of a width W1 obtained by excluding widths of both edge portions of the rubber sheet from the width of the rubber sheet. With such a configuration, although the ear portion rubbers M4 cut away from the rubber sheet M3 after rolling are returned to both end portions of the hank M2, it is possible to suppress that an amount of bank becomes small at the center portion in the roll axial direction. Accordingly, it is possible to make an amount of bank in the axial direction J of the calender rolls 14, 16 uniform thus enhancing a quality of a rubber sheet.

Further, a swing width of the rubber supply device 20 from the center CE of a width of the rubber sheet in a partial width moving mode is set corresponding to the difference between amounts of banks at both end portions such that a larger amount of rubber material is supplied onto an end portion side where an amount of bank is small. Accordingly, the difference between an amount of bank at a left end portion and an amount of bank at a right end portion can be adjusted while the amounts of banks at both end portions and an amount of bank at the center portion are adjusted. With such a configuration, an effect of making an amount of bank in the axial direction J of the calender rolls 14, 16 uniform can be further enhanced.

Further, with the configuration where when the difference between amounts of banks at both end portions is a second threshold value or more, the rubber supply device 20 is operated in the one-side moving mode in which a continuous rubber material M1 is supplied only on one end portion side where an amount of bank is small, even if the difference between amounts of banks at both end portions becomes excessively large, such a state of the bank can be returned to a state where an amount of bank is uniform at an early stage.

As described above, according to this embodiment, it is possible to make an amount of bank uniform in the axial direction J of the calender rolls 14, 16 and hence, even when a rubber sheet M3 to be formed has a large width, it is possible to form the rubber sheet M3 having a fixed thickness while maintaining a line speed at a certain level. Further, productivity can be enhanced including the reduction of an amount of scrap.

In the above-mentioned embodiment, an amount of oscillation, in a partial width moving mode (D1') where a swing width differs between left and right sides is set to a value equal to an amount of oscillation W1 in a partial width moving mode (D1) where a swing width is set uniformly on left and right sides. However, a swing width in a partial width moving mode (D1') may be set to a value different from an amount of oscillation W1 in a partial width moving mode (D1).

Further, in the above-mentioned embodiment, the sensor 34 for detecting the amounts of banks is provided only at two positions corresponding to both end portions in the axial direction J of the calender rolls 14, 16. However, the sensor 34 may be provided also at the center portion in the axial direction J. By providing the sensor 34 also at the center portion, the irregularity in amount of hank between both end portions and the center portion can be detected and hence, a ratio between a full width moving mode (D0) and a partial width moving mode (D1) may be set based on a detection result. For example, when the difference between an amount of bank at the center portion and amounts of banks at both end portions is a predetermined value or more and an amount of hank at the center portion is large, an operation ratio in a partial width moving mode (D1) may be set to a low value. To the contrary, when an amount of bank at the center portion is small, an operation ratio in the partial width moving mode (D1) may be set to a high value.

The application of the rubber sheet according to this embodiment is not particularly limited. For example, the rubber sheet according to this embodiment can be used for manufacturing various rubber sheets such as an inner liner, a carcass ply or a belt ply of a pneumatic tire.

The above-mentioned embodiment is described as an example, and does not intend to limit the scope of the invention. The above-mentioned novel embodiments can be carried out in the form of various modifications, and omissions, replacements and changes can be made without departing from the gist of the invention.

What is claimed is:

1. An apparatus for manufacturing a rubber sheet comprising:
   a pair of calender rolls which forms a bank as a rubber pool;
   a supply conveyor which supplies a continuous rubber material to the calender rolls for forming the bank; and
   a rubber supply device which supplies the continuous rubber material onto the supply conveyor in a meandering state by supplying the continuous rubber material onto the supply conveyor while moving in a reciprocating manner in an axial direction of the calender rolls, wherein
   the rubber supply device has a full width moving mode in which the rubber supply device moves in the axial direction of the calender rolls such that the continuous rubber material placed on the supply conveyor has a meandering shape of a width corresponding to a width of a rubber sheet, and a partial width moving mode in which the rubber supply device moves in the axial direction of the calender rolls such that the continuous rubber material placed on the supply conveyor has a meandering shape of a width obtained by excluding widths of both edge portions of the rubber sheet from the width of the rubber sheet.

2. The apparatus for manufacturing a rubber sheet according to claim 1 further comprising:
   a sensor which detects an amount of bank at two end portions in the axial direction of the calender rolls; and
   a controller which sets a swing width of the rubber supply device in the partial width moving mode from the center of the width of the rubber sheet such that the swing width on an end portion side where an amount of bank detected by the sensor at one of the two end portions is smaller than an amount of bank detected by the sensor at the other of said two end portions.

3. The apparatus for manufacturing a rubber sheet according to claim 2, wherein
the rubber supply device has a one-side moving mode in which the rubber supply device moves in the axial direction of the calender rolls such that the continuous rubber material placed on the supply conveyor has a shape which meanders only on one side with respect to the center of the width of the rubber sheet, and
the controller is configured so as to:
operate the rubber supply device in a partial width moving mode in which the swing width is set uniformly on left and right sides when a difference between amounts of banks at said two end portions detected by the sensor is less than a first threshold value,
operate the rubber supply device in a partial width moving mode in which the swing width on the end portion side where the amount of bank is smaller is set larger than the swing width on another end portion side where the amount of bank is larger when the difference between amounts of banks at said two end portions detected by the sensor is equal to or more than the first threshold value and less than a second threshold value larger than the first threshold value, and
operate the rubber supply device in the one-side moving mode in which the continuous rubber material is supplied only to the end portion side where the amount of bank is smaller when the difference between amounts of banks at said two end portions detected by the sensor is the second threshold value or more.

4. The apparatus for manufacturing a rubber sheet according to claim 1, wherein
the rubber supply device comprises an extruder which continuously extrudes a rubber material, and an oscillating conveyor which supplies an extruded continuous rubber material to the supply conveyor, and the oscillating conveyor is configured such that an end portion of the oscillating conveyor on a supply conveyor side is movable in a reciprocating manner in the axial direction of the calender rolls using an end portion of the oscillating conveyor on an extruder side as a pivot thus enabling the supply of the continuous rubber material onto the supply conveyor in a meandering state.

* * * * *